United States Patent
Rearden

(10) Patent No.: US 12,392,563 B2
(45) Date of Patent: Aug. 19, 2025

(54) FLEXIBLE MAT WITH FLUID CONDUIT, METHOD OF MANUFACTURE THEREOF AND APPARATUS FOR THE MANUFACTURE THEREOF

(71) Applicant: BioTherm Hydronic, Inc., Cotati, CA (US)

(72) Inventor: Jim Rearden, Petaluma, CA (US)

(73) Assignee: BioTherm Hydronic, Inc., Cotati, CA (US)

(*) Notice: Subject to any disclaimer, the term of this patent is extended or adjusted under 35 U.S.C. 154(b) by 1075 days.

(21) Appl. No.: 17/006,611

(22) Filed: Aug. 28, 2020

(65) Prior Publication Data
US 2021/0063096 A1 Mar. 4, 2021

Related U.S. Application Data

(60) Provisional application No. 62/893,773, filed on Aug. 29, 2019.

(51) Int. Cl.
*F28F 3/12* (2006.01)
*A01G 25/02* (2006.01)
(Continued)

(52) U.S. Cl.
CPC .............. *F28F 3/12* (2013.01); *A01G 25/02* (2013.01); *A01G 25/06* (2013.01); *B29C 65/02* (2013.01);
(Continued)

(58) Field of Classification Search
CPC ........ F28F 3/12; B29C 65/02; B29K 2101/12; B29L 2031/18; B29L 2031/7324
(Continued)

(56) References Cited

U.S. PATENT DOCUMENTS

| | | | | |
|---|---|---|---|---|
| 2,522,346 A | * | 9/1950 | Carson | B29C 65/106 156/289 |
| 3,939,875 A | * | 2/1976 | Osborn | E02B 13/00 138/119 |

(Continued)

FOREIGN PATENT DOCUMENTS

| | | | | |
|---|---|---|---|---|
| WO | WO-02082888 A1 | * | 10/2002 | ............. A01G 25/06 |
| WO | WO-2007062517 A1 | * | 6/2007 | ............. A01G 9/245 |
| WO | WO-2014029766 A2 | * | 2/2014 | ............. A01G 25/02 |

OTHER PUBLICATIONS

Michael J. Troughton, Chapter 12—Heat Sealing, 2009, William Andrew Publishing, 2nd Edition, pp. 121-126, ISBN 9780815515814 (Year: 2009).*

(Continued)

*Primary Examiner* — Jenna M Maroney
(74) *Attorney, Agent, or Firm* — Derek J. Westberg, Esq.

(57) ABSTRACT

The present invention provides a flexible mat with fluid conduit, methods of manufacture thereof and apparatus for the manufacture thereof. In an embodiment, the mat comprises a base layer, one or more fluid conduits and a thermoplastic bonding tape that attaches the fluid conduits to the base layer. The base layer can be a textile fabric, mesh or netting, or a flat flexible sheet. The base layer is preferably also formed of a thermoplastic layer. The fluid conduits can carry heated or cooled fluid, such as water, that can be used for heating or cooling an environment in which the device is deployed. For example, the device can be used for heating or cooling in a greenhouse environment. The fluid conduits can additionally or alternatively carry irrigation fluids, such as water or treated water, for irrigating plants and crops. The fluid conduits can additionally or alternatively carry gases, such as carbon dioxide ($CO_2$) or carbon dioxide mixed with other gasses, for treating plants and crops.

10 Claims, 11 Drawing Sheets

(51) Int. Cl.
*A01G 25/06* (2006.01)
*B29C 65/02* (2006.01)
*B29K 101/12* (2006.01)
*B29L 31/00* (2006.01)
*B29L 31/18* (2006.01)

(52) U.S. Cl.
CPC ....... *B29K 2101/12* (2013.01); *B29L 2031/18* (2013.01); *B29L 2031/7324* (2013.01)

(58) Field of Classification Search
USPC .......................................................... 165/84
See application file for complete search history.

(56) References Cited

U.S. PATENT DOCUMENTS

| | | | | |
|---|---|---|---|---|
| 4,065,926 A * | 1/1978 | Brandt | ................... | A01G 25/06 47/1.01 R |
| 4,112,921 A * | 9/1978 | MacCracken | ........... | F24S 20/67 165/46 |
| 4,577,435 A * | 3/1986 | Springer | ................... | A01G 9/24 47/2 |
| 4,807,394 A | 2/1989 | Lyon | | |
| 4,817,707 A | 4/1989 | Aoyama et al. | | |
| 4,823,771 A * | 4/1989 | Menning | ................ | F24S 20/55 126/906 |
| 5,251,689 A * | 10/1993 | Hakim-Elahi | .......... | F24S 20/64 165/56 |
| 5,368,092 A * | 11/1994 | Rearden | .................. | E01C 13/02 165/45 |
| 5,477,914 A | 12/1995 | Rawlings | | |
| 5,839,659 A * | 11/1998 | Murray | ................... | A01G 25/06 239/145 |
| 6,516,142 B2 | 2/2003 | Grant et al. | | |
| 6,571,833 B1 * | 6/2003 | McLarty, III | ............ | H02G 9/06 112/155 |
| 6,996,932 B2 | 2/2006 | Kruer et al. | | |
| 7,647,724 B2 | 1/2010 | Caron et al. | | |
| 8,011,135 B2 | 9/2011 | Masser et al. | | |
| 8,132,739 B2 * | 3/2012 | Theor | ..................... | A01G 9/247 47/79 |
| 8,816,251 B2 | 8/2014 | Olsen et al. | | |
| 9,137,956 B1 * | 9/2015 | Pujadas | ................... | A01G 25/06 |
| 9,309,996 B2 * | 4/2016 | Gould | ................... | A01G 25/02 |
| 9,668,433 B2 * | 6/2017 | Pujadas | ................... | A01G 25/06 |
| 9,795,094 B2 | 10/2017 | Roess et al. | | |
| 10,085,391 B2 * | 10/2018 | Haub | ................... | A01G 13/0268 |
| 10,349,468 B2 | 7/2019 | Schumacher | | |
| 11,058,073 B2 * | 7/2021 | Lortscher | ............ | A01G 13/0268 |
| 2002/0049409 A1 | 4/2002 | Noda et al. | | |
| 2003/0213171 A1 * | 11/2003 | Kruer | ................ | A01G 13/0281 47/62 E |
| 2004/0098908 A1 | 5/2004 | Miyajima et al. | | |
| 2005/0178056 A1 * | 8/2005 | Morrone | ................ | A01G 13/0268 47/9 |
| 2006/0185241 A1 * | 8/2006 | Theoret | ................... | A01G 25/06 47/79 |
| 2006/0201061 A1 * | 9/2006 | Caron | ..................... | A01G 27/04 47/79 |
| 2006/0216405 A1 | 9/2006 | Lee | | |
| 2007/0144065 A1 * | 6/2007 | Lowe | ..................... | A01G 25/06 47/21.1 |
| 2008/0282609 A1 * | 11/2008 | Nelson | ................ | A01G 13/0268 47/48.5 |
| 2009/0134242 A1 * | 5/2009 | Theoret | ................... | A01G 9/245 405/36 |
| 2012/0111972 A1 | 5/2012 | Théorêt et al. | | |
| 2012/0279120 A1 * | 11/2012 | Prescott | ................ | A01G 25/06 47/48.5 |
| 2013/0075490 A1 * | 3/2013 | Roess | ..................... | A01G 25/06 239/145 |
| 2014/0096931 A1 | 4/2014 | Keiichiro et al. | | |
| 2014/0116644 A1 | 5/2014 | Kaneko | | |
| 2014/0150987 A1 | 6/2014 | Kaneko et al. | | |
| 2016/0088806 A1 * | 3/2016 | Haub | ................ | A01G 13/0268 111/118 |
| 2016/0100457 A1 | 4/2016 | Cole et al. | | |
| 2016/0192442 A1 | 6/2016 | Corona | | |
| 2016/0193781 A1 | 7/2016 | Nussbaum | | |
| 2016/0236399 A1 | 8/2016 | Nussbaum et al. | | |
| 2019/0224924 A1 * | 7/2019 | Caldwell | ............ | B29C 66/73772 |
| 2020/0180231 A1 * | 6/2020 | Matsen | ................ | B29C 65/2038 |

OTHER PUBLICATIONS

WO 02082888 A1 English Machine Translation (Year: 2002).*
Miller Weldmaster, 112 Extreme, accessed at https://www.weldmaster.com/machines/112-extreme on Aug. 25, 2020, pp. 1-10.

* cited by examiner

FLEXIBLE MAT WITH FLUID CONDUIT, METHOD OF MANUFACTURE THEREOF AND APPARATUS FOR THE MANUFACTURE THEREOF

This application claims priority of U.S. Provisional Application No. 62/893,773, filed Aug. 29, 2019, the entire content of which is hereby incorporated by reference.

BACKGROUND OF THE INVENTION

The present invention relates to the field of flexible mats with fluid conduit which can be used for heating and cooling. More particularly, the present invention relates to flexible mats with fluid conduit and to methods of, and apparatus for, the manufacture of such mats.

Heating and cooling devices are useful in myriad situations. For example, heating and cooling devices can be used for heating and cooling in greenhouses and other environments. In a greenhouse environment, heating and cooling can be accomplished using fluid conduits that carry heated or cooled fluid, which then heats or cools interior spaces of the greenhouse. The fluid carrying conduits may be present in a mat that can, for example, be laid on the floor of a greenhouse or placed on raised planting beds. As another example, a mat carrying heated fluid can be used in cold outdoor environments to melt ice or snow from walkways or driveways It is desired to provide improved flexible mats with fluid conduit which can be used for heating or cooling. It is further desired to provide improved methods and apparatus for the manufacture of such mats.

SUMMARY OF THE INVENTION

The present invention provides a flexible mat with fluid conduit, methods of manufacture thereof and apparatus for the manufacture thereof. In accordance with an embodiment, a flexible mat with fluid conduit is provided. The mat comprises: a flexible base layer; a plurality of fluid conduits arranged substantially in parallel to each other and adjacent to the base layer; and a plurality is strips of tape arranged substantially in parallel to each other and substantially orthogonal to the fluid conduits. The strips of tape are bonded to the base layer. For example, the tape may be thermoplastically welded to the base layer.

One or more of the plurality of fluid conduits may be configured to carry heat transfer fluid to form part of a closed recirculating environmental control system. Alternatively or additionally, one or more of the plurality of fluid conduits may be configured to carry irrigation water. For example, the fluid conduits may have perforations or may accept irrigation fittings. Alternatively or additionally, one or more of the plurality of fluid conduits may be configured to carry gas, e.g., carbon dioxide gas. Moreover, the plurality of fluid conduits may be configured to carry two or more fluids such as heat transfer fluid, irrigation water, and gas.

In accordance with an embodiment of the present invention, a method of manufacture of a flexible mat with fluid conduit is provided. The method includes: placing a plurality of fluid conduits oriented substantially parallel to each other against a flexible base layer; and applying strips of thermoplastic bonding tape over the fluid conduits. The strips of thermoplastic bonding tape are oriented substantially orthogonal to the fluid conduits. The strips of thermoplastic bonding tape may be applied by welding the strips of thermoplastic bonding tape to the base layer. The fluid conduits are captured between the tape and the base layer.

The base layer may be thermoplastic. Applying of the strips of thermoplastic bonding tape may include: unrolling the bonding tape from a roll of bonding tape; and pressing a heat sealing bar against the strips of thermoplastic bonding tape.

Welding the strips of thermoplastic bonding tape to the base layer may include successively heating portions of each tape strip and immediately bringing the heated portions of thermoplastic bonding tape into contact with the base layer. Applying strips of thermoplastic bonding tape may include: unrolling the bonding tape from a roll of bonding tape; applying heated air to the bonding tape; and pressing the bonding tape into contact with the base material layer using a roller. Cooling air may be applied to the roller.

The method may also include: unwinding the base layer from a first roll; and winding the base layer with the fluid conduits attached into a second roll. A shaft for the second roll may be driven according to increments, where each increment determines spacing between the strips of thermoplastic bonding tape.

In accordance with an embodiment of the present invention, an apparatus for the manufacture of flexible mat with fluid conduit is provided. The apparatus comprises: a substantially flat plate configured to support at least a portion of a flexible sheet of base layer; a plurality of guides configured to position each of a plurality of fluid conduits parallel to each other and over the plate; a holder configured to hold a roll of thermoplastic bonding tape; a heating element configured to apply heat to the thermoplastic bonding tape; and a pressure applicator configured to press the bonding tape into contact with the base layer.

A heat sealing bar may comprise the heating element. The pressure applicator may press the heat sealing bar into contact with the thermoplastic bonding tape, thereby pressing the bonding tape into contact with the base layer.

The pressure applicator may comprise: a shuttle that is movable with respect to the plate in a direction that is substantially orthogonal to the orientation of the fluid conduits; and a roller attached to the shuttle and configured to apply bonding tape over the fluid conduits thereby pressing the bonding tape into contact with the base layer. The shuttle may be configured to hold a roll of thermoplastic bonding tape. The apparatus may be configured such that, while the shuttle is in motion, the bonding tape is unrolled from the roll of bonding tape, the bonding tape is heated, and the bonding tape is pressed into contact with the base layer using the roller. A suction cup lifter may be attached to the shuttle and configured to lift the tape. A cutter may be configured to cut the tape.

The apparatus may also include: a first rotatable shaft configured to unwind a roll of the base layer; and a second rotatable shaft configured to wind the base layer with the fluid conduits attached into a roll. A plurality of spools may be configured to hold the plurality fluid conduits so that the fluid conduits are drawn into the plurality of guides upon rotation of the second rotatable shaft. The second rotatable shaft can be motor driven. A braking mechanism may be coupled to the first rotatable shaft for maintaining tension in the base layer. The apparatus may be configured to rotate the first rotatable shaft between the application of successive strips of the bonding tape. An amount of the rotation may determine spacing of the successive strips of bonding tape.

These and other aspects of the present invention are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
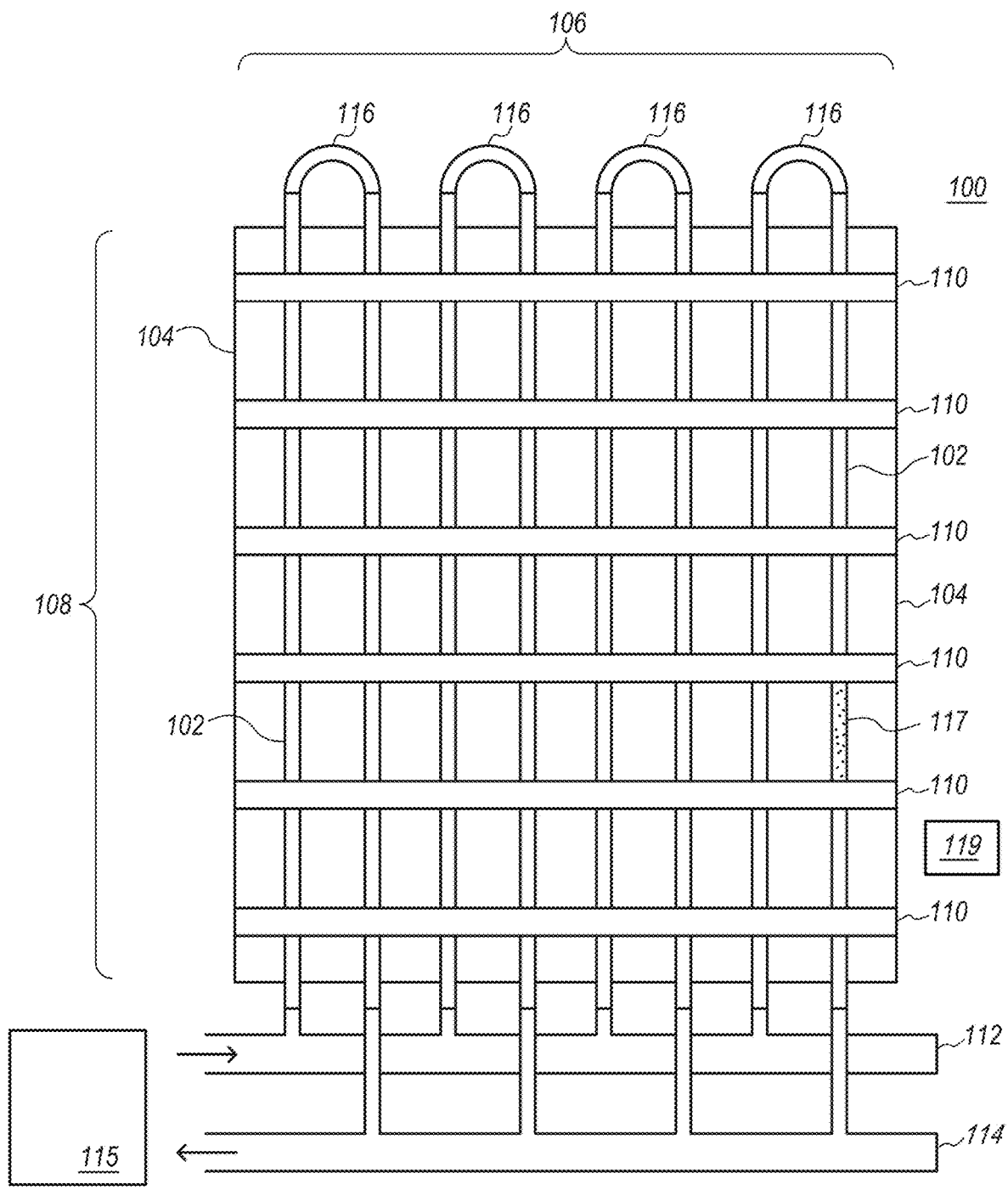
FIG. 1 illustrates a top view of a flexible mat with fluid conduit in accordance with an embodiment of the present invention.

A flexible mat with fluid conduit is described. In accordance with an embodiment, such a mat comprises a base layer, one or more fluid conduits and a thermoplastic bonding tape that attaches the fluid conduits to the base layer. The thermoplastic bonding tape may also be referred to as "weld tape." The base layer can be, for example, a textile fabric, mesh or netting, or a flat flexible sheet. The base layer is preferably also formed of a thermoplastic material. The fluid conduits are also preferably flexible. The conduits can carry heat transfer fluid, such as heated or cooled water, that can be used for heating or cooling an environment in which the device is deployed. For example, the device can be used for heating or cooling in a greenhouse environment. The fluid conduits can additionally or alternatively carry irrigation fluids, such as water or treated water, for irrigating plants and crops. Such treated irrigation water can include water mixed with fertilizer and/or water infused with carbon dioxide ($CO_2$) gas. The fluid conduits can additionally or alternatively carry gases, such as carbon dioxide ($CO_2$) or carbon dioxide mixed with other gasses, for treating plants and crops.

A method of manufacture of a flexible mat with fluid conduit is also described. In accordance with an embodiment, such a method comprises placing a plurality of fluid conduits oriented substantially parallel to each other against a base sheet material and applying strips of thermoplastic bonding tape over the fluid conduits. The strips of thermoplastic bonding tape can be oriented substantially orthogonal to the fluid conduits. The strips of thermoplastic bonding tape can be applied by welding the strips of thermoplastic bonding tape to the base layer. The tape is thereby adhered to the base layer and the fluid conduits are captured between the tape and the base material. In an embodiment, a heat sealing bar can be pressed against the strips of thermoplastic bonding tape. In another embodiment, the tape can be heated and a roller can be used to press the heated tape onto the base material. The base material is also preferably a thermoplastic material; in this case, the heat sealing bar can be used to heat portions of the base material or the base material can be heated just prior to being brought into contact with the bonding tape.

An apparatus for the manufacture of flexible mat with fluid conduit is also described. In accordance with an embodiment, such an apparatus attaches fluid conduit to a base sheet material in a customizable configuration. The apparatus is configured to unwind a roll of the base material that is mounted to a rotatable shaft and to pass the material over a substantially flat plate. The apparatus is configured to simultaneously unwind fluid conduit from a plurality of spools and to position a plurality of the fluid conduits, one for each spool, over the plate and the base material. The fluid conduits are preferably positioned substantially parallel to each other at predetermined and adjustable spacing. The apparatus is configured to apply a strip of thermoplastic bonding tape over the fluid conduits. The strip of thermoplastic bonding tape can be oriented substantially orthogonal to the fluid conduits. The apparatus is configured to apply heat to the thermoplastic bonding tape and to bring the tape into contact with the base material so that the tape is welded to the base layer and the fluid conduits are captured between the tape and the base layer. This can be accomplished, in part, by continuously applying heat energy to the tape in the form of heated air while the tape is being unrolled and pressed onto the base material. The apparatus may comprise a roller and a substantially flat plate. The roller can be used to press the heated tape onto the base material while the base material is supported by the substantially flat plate. Alternatively, a heat sealing bar can be used to press the tape onto the base material while the base material is supported by the substantially flat plate. The heat sealing bar can include a heating element that heats the tape.

The base layer is also preferably a thermoplastic material. The apparatus is can be configured to heat portions of the base layer being brought into contact with the bonding tape.

The tape can be cut into strips. The length of the strips is approximately equal to, or slightly greater than, the width of the base material. To accomplish cutting the tape into strips, the tape can be cut near the edge of the base material each time a portion of the tape has been adhered across the width of the base material.

The tape can be cut into strips. As used herein, the term "strip" has its ordinary meaning, i.e. long and narrow. The length of the strips is approximately equal to, or slightly greater than, the width of the base material. To accomplish cutting the tape into strips, the tape can be cut near the edge of the base material each time a portion of the tape has been adhered across the width of the base material.

The material can then be removed from the rewind shaft for further processing and sale. Such further processing can include cutting the material to desired lengths and adding couplings and/or fittings to the fluid conduits.

The mat with fluid conduit attached, as described herein, can be used in a variety of applications. For example, the mat can be used in the field of horticulture. Such uses can include heating and/or cooling greenhouse environments, delivering irrigation water and/or delivering gas (e.g., carbon dioxide) to the greenhouse environment. In a particular horticultural application, the mat can be used to deliver irrigation water to a flood table. In this case, the mat can lay at the bottom of a plant tray with containers holding the plants placed on top of the mat. In this case, the mat can provide irrigation water that is used to periodically flood the plant tray. The mat may also deliver carbon dioxide gas to the greenhouse environment. In an embodiment, the base layer can comprise a fluid impermeable material so that the mat itself can serve as the bottom of the plant tray. In such an embodiment, the mat may be held under tension by a table frame or may be supported (e.g., by an expanded metal table top) in order to support the weight of the water and plants. In such an embodiment, sides for the plant tray can be attached to the table frame and/or directly to the mat. The mat can also be used in outdoor horticultural environments. For example, the mat can be used to prevent freezing and/or to deliver irrigation in such outdoor environments. In a particular example, the mat can be used in connection with sports fields. In an embodiment, the mat can be installed beneath live turf grass and used to apply heat to avoid freezing of the turf grass or to melt snow and ice from the turf grass. In such an embodiment, the mat can be used to deliver irrigation water to the turf grass (i.e. by sub-irrigation). In a further embodiment, the mat may be configured to accept greenhouse hoop structures where the hoops are configured to support a poly greenhouse cover. For example, one or both edges of the mat may have attached tubes or loops or other fittings that are configured to attach at or near the ends of the greenhouse hoops. In this case, the mat can serves as a floor for a "hoop house" or "poly tube" type of greenhouse.

The mat with fluid conduit attached, as described herein, can be used in additional applications. For example, the mat can be used for heating and/or cooling zoo animal or livestock animal enclosures. As another example, the mat can be employed in radiant floor heating systems in buildings, such as homes, offices and factories. In still another embodiment, the mat can be used to melt snow and ice present on outdoor surfaces such driveways or walkways. This can be accomplished by installing the mat beneath the outdoor surface or by laying the mat on the outdoor surface. It will be apparent that the above applications are intended to be exemplary and that additional applications are possible.

FIG. 1 illustrates a mat 100 with fluid conduit 102 in accordance with an embodiment of the present invention. The conduit 102 can be any type of tubing or conduit, but is preferably a flexible plastic or polymer. Examples of suitable conduit include, but are not limited to, irrigation tubing (which may be perforated and/or capable of accepting barbed irrigation fittings), gas tubing (which may or may not be gas-permeable), tubing suitable for carrying various types of fluids, such as water and gas, and tubing made from materials such as polyvinyl chloride, polypropylene, polypropene, polyethylene, linear low-density polyethylene, high density polyethylene, synthetic rubber, high-density synthetic rubber, such as Ethylene Propylene Diene Monomer rubber (EPDM), cross-linked polyethylene (PEX) and so forth.

The mat 100 further comprises a sheet material 104, which can be, for example, a textile fabric, mesh, netting, or flat flexible sheet. The material 104 serves as a base layer for the mat 100. The base layer 104 has a width 106 and a length 108. The base material 104 is preferably obtained in rolls of various widths, which can be in standard sizes, such as 4, 6, 8, 10 or 12 feet, for example. The length 108 can therefore be any dimension up to a maximum length available in rolled form (though rolls can be spliced together at the ends for longer lengths or along their sides for wider widths).

The base material 104 can be water permeable, or water impermeable, depending on the application. Suitable base materials include but are not limited to weed-blocking and/or light-blocking fabrics, which can be obtained in various colors including white for reflecting light or black for absorbing light. Specific examples include plastic netting or mesh, which can allow for the passage of debris such as dirt or other planting substrates, or polymer fabrics. In a preferred embodiment, the base material is thermoplastic. In an embodiment, the base material 104 is configured to be heat insulating. For example, the base material 104 may be formed from a thick plastic material which serves as an insulator and which may also be thermoplastic. Alternatively, the base material 104 may include a laminate having an insulating layer (e.g., a closed cell insulation material) and one or more other layers (e.g., a thermoplastic mesh). Such an insulating layer may be attached to one side of the thermoplastic layer before or after the conduits are attached to the other side of the thermoplastic layer. Still further, such an insulating layer may be attached over the conduits after the conduits are attached to the material 104.

The fluid conduit 102 is attached to the base material 104 by bonding tape 110. The bonding tape 110 is preferably a thermoplastic, such as polyethylene, polypropylene or polyvinyl chloride. In this case, the tape 110 is can be welded to the base material by heating the tape prior to applying the tape over the fluid conduits 102 or by heating the tape after the tape is applied over the fluid conduits. In either case, the heated tape is preferably pressed onto the base material 104 thereby welding the tape to the base material 104.

Figure 2:
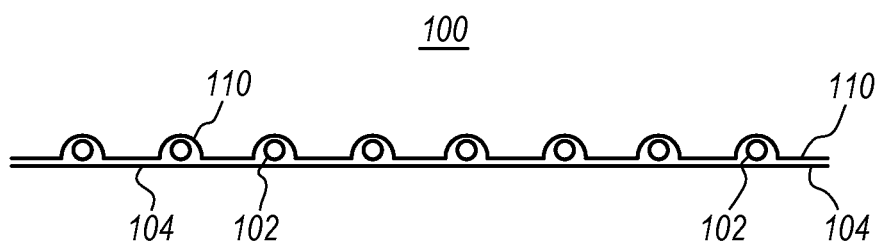
FIG. 2 illustrates a cross-sectional view of the flexible mat with fluid conduit of FIG. 1 in accordance with an embodiment of the present invention.

FIG. 2 illustrates a cross-sectional view of the mat 100 with fluid conduit 102 of FIG. 1 in accordance with an embodiment of the present invention. As shown in FIG. 2, the fluid conduits 102 are positioned between the base material 104 and the tape 110. Alternatively or additionally to thermoplastic bonding, the tape 110 may be bonded to the base material by the addition of an adhesive substance, such as polyurethane glue, spray adhesive or hot glue, or by an adhesive coating applied to the tape 110 such as a pressure sensitive adhesive.

The tape 110 can be adhered to the base material 104 or the tape 110 can be adhered to the base material 110 and the fluid conduit 102. For example, depending upon whether the fluid conduit 102 is thermoplastic, and the amount of heat energy applied to the tape 110, the tape 110 can be adhered only to the base material 104, in which case, the fluid conduit 102 is attached to the base material 104 by being trapped between the tape 110 and the base material 104 but not necessarily being adhered to the fluid conduit 102. Alternatively, the tape 110 can be adhered to the base material 104 and to the fluid conduit 102. For example, if the tape 110 is coated with adhesive, the tape 110 can be adhered to the base material 104 and the fluid conduit 102.

As shown in FIG. 1, the fluid conduits 102 are preferably positioned substantially parallel to each other and spaced across the width 106 of the base material. As is also shown in FIG. 1, the spacing between the fluid conduits can be substantially uniform. However, the spacing of the conduits is preferably adjustable to suit various applications. For example, the conduits may be spaced closer together or farther apart. Additionally, the spacing can vary across the width of the base material; for example, for heating applications, the conduits 102 closer to the outside edges can be spaced more closely to compensate for heat loss near the edges, whereas, the conduits 102 positioned in the middle can be spaced more widely. Further, the fluid conduits 102 may be spaced to accommodate plant containers. For example, the fluid conduits 102 may be spaced so that plant containers may be placed between the conduits 102 so as to avoid the plant containers from crushing the fluid conduits 102. Or, the fluid conduits 102 may be spaced so that plant containers may be placed directly on the conduits 102 so as to maximize heat transfer to the plant containers. In a further embodiment, suggested placements for plant containers (e.g., to achieve appropriate spacing between plants) may be printed directly on the mat (e.g., using the print head described herein).

As shown in FIG. 1, the conduits 102 can be coupled to an inlet manifold 112 and to an outlet manifold 114. For example, alternating ones of the conduits 102 can, at one end of the conduits 102, be coupled to the inlet manifold 112, while the remaining conduits 102 can, at one end of the conduits 102, be coupled to the outlet manifold 114. As is also shown in FIG. 1, at opposite ends, the conduits can be coupled to each other. More particularly, conduits 102 that are coupled to the inlet manifold 112 can be coupled to the conduits 102 that are coupled to the outlet manifold 114 by u-shaped "elbow" couplers 116. It will be apparent that other arrangements are possible. For example, the elbow couplers 116 can be replaced with straight couplers which would allow further lengths of conduit to be connected to them (e.g., to splice mats together). As another example, the elbow couplers 116 can be replaced with T-couplers which would allow the ends of the conduits to be coupled to each other and to further lengths of conduit. The conduits 102 can be coupled to the inlet manifold 112, to the outlet manifold 114 and to the "elbow" couplers 116 by, for example, compression fittings or clamps.

As shown in FIG. 1, fluid that enters the input manifold 112 can flow through the conduits 102 and then return to the outlet manifold 116. Heated or cooled fluid can thus flow through the mat 100 so that the mat 100 functions as a heating or cooling device, respectively. In such an embodiment, the mat 100 can be part of a closed recirculating environmental control system 115 with the fluid being heated or cooled externally to the mat 100, e.g., by a boiler or chiller, and cyclically returned to the mat 100.

In further embodiments, the conduits 102 may be used for one-way delivery of fluids, which can include gases. For example, in an irrigation system, the return manifold 116 can be omitted and the ends of the conduits 102 that would otherwise be connected to the return manifold 116 can be closed such that water or treated water instead exits the conduits 102 through perforations 117 or through irrigation fittings 119 located along the conduits 102. Such irrigation fittings may include drip or spray irrigation fittings. Such irrigation water can be treated by infusing the water with CO2 gas, in which case, the infused water can be, for example, delivered directly to plant leaves by foliar spraying via the conduits 102 present in the mat 100.

In still further embodiments, some of the conduits 102 attached to a mat 100 can carry one type of fluid while other conduits attached to the mat can carry another type of fluid. For example, some of the conduits 102 can be connected to each other to carry heating or cooling fluid as part of a closed heating or cooling system while other conduits 102 can be connected to each other to deliver irrigation water or to deliver $CO_2$ gas. Such $CO_2$ gas could be generated by the same boiler that is also used to generate heated water which is delivered to the conduits 102 used for heating.

Figure 3:
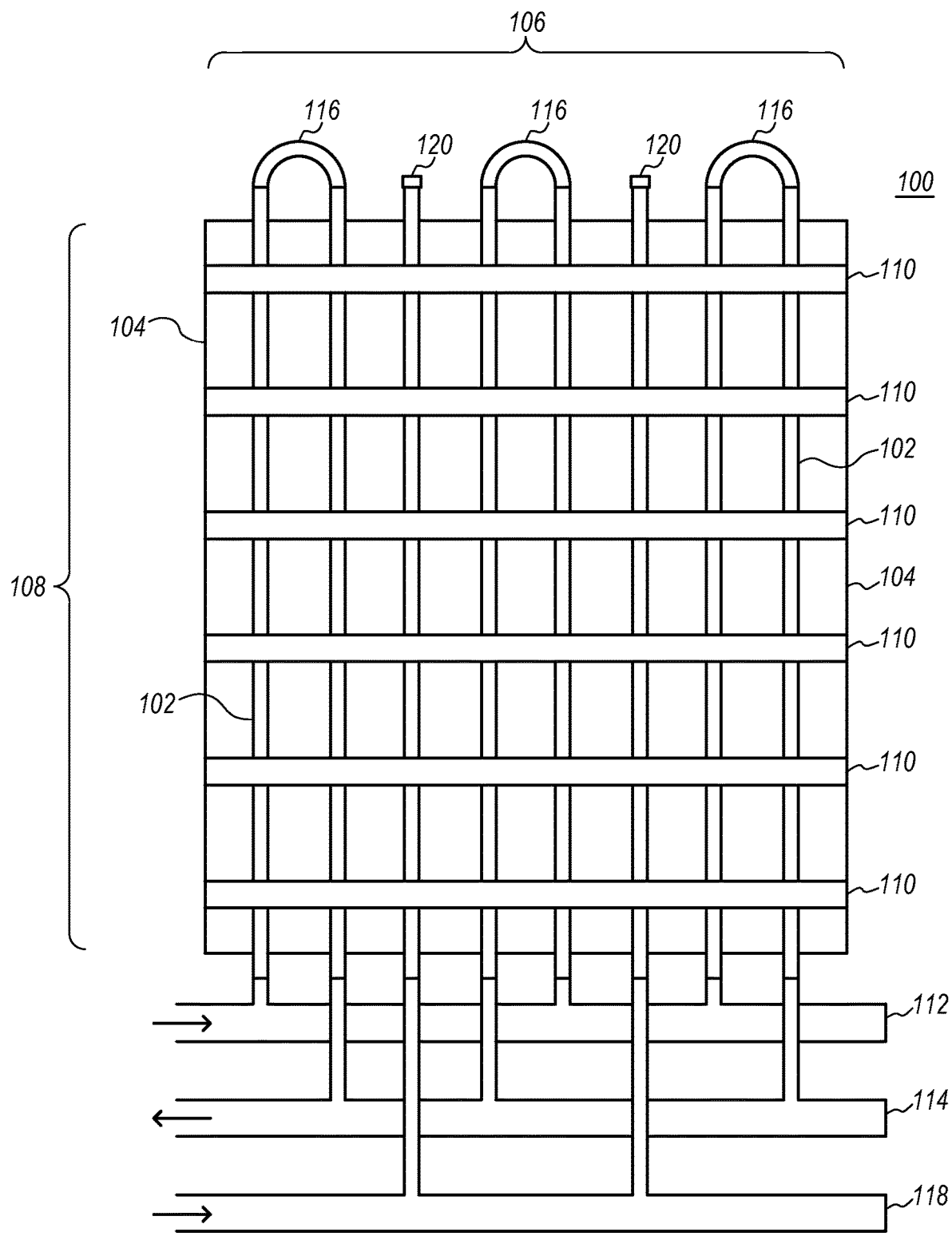
FIG. 3 illustrates a top view of a mat with fluid conduit in accordance with an alternative embodiment of the present invention.

FIG. 3 illustrates an example of such a mat. As shown in FIG. 3, the conduits 102 can be coupled to a first inlet manifold 112, to an outlet manifold 114 or to a second inlet manifold 118. For example, selected ones of the conduits 102 can, at one end of the conduits 102, be coupled to the first inlet manifold 112, while other conduits 102 can, at one end of the conduits 102, be coupled to the outlet manifold 114. As is also shown in FIG. 3, at opposite ends, these conduits can be coupled to each other by u-shaped "elbow" couplers 116. The conduits coupled to the manifolds 112 and 114 can be part of a closed heating or cooling system. Other ones of the conduits 102 can be coupled to the second inlet manifold 118. These conduits can be capped at their opposite ends by caps 120 and can include, for example, irrigation tubing (which may be perforated and/or capable of accepting irrigation fittings, e.g., barbed fittings), or gas tubing (which may or may not be gas-permeable). It will be apparent that other arrangements of conduit connections, caps, manifolds and tubing types are possible.

Figure 4:
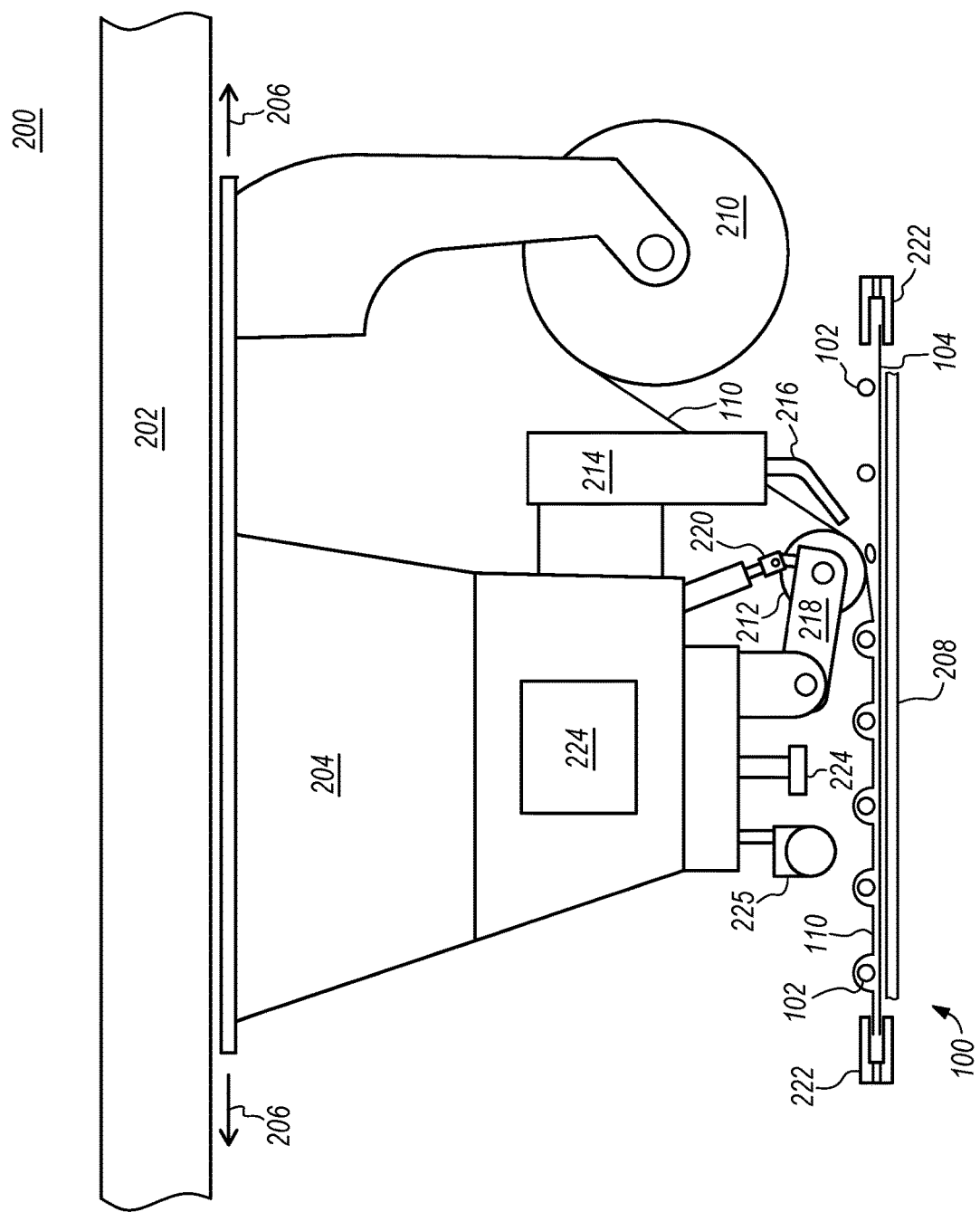
FIG. 4 illustrates a front view of an apparatus for the manufacture of a mat with fluid conduit in accordance with an embodiment of the present invention.

FIG. 4 illustrates an apparatus 200 for the manufacture of a mat 100 with fluid conduit 102 in accordance with an embodiment of the present invention. As shown in FIG. 4, the apparatus 200 comprises a stationary beam 202 and a movable shuttle assembly 204. For this purpose, the beam 202 can be fitted with an internal or external linear track or bearing surface, while the shuttle 204 can be fitted with wheels or bearings that are movable along the track. The direction of movement of the shuttle 204 is left and right in the plane of the figure, as shown by arrows 206.

The apparatus 200 of FIG. 2 has a substantially flat elongated plate 208 against which the base material 104 and conduits 102 are positioned. The plate 208 is preferably in a fixed position such that the shuttle 204 moves in relation to the plate 208. For example, the plate 208 can be fixed in relation to the beam 202. The plate 208 is preferably at least as long as the base material 104 is wide. However, the width of the plate 208 need only be as wide at the width of the bonding tape 110. For example, the plate 208 may be approximately twelve feet in length to accommodate base material 104 widths of up to twelve feet. However, the plate need only be approximately two to three inches wide to accommodate bonding tape widths of between two and three inches. It will be apparent that these dimensions are exemplary and that other dimensions are possible.

The base material 104 and conduits 102 are shown in cross section in FIG. 4, similar to FIG. 2. A reel 210 of bonding tape 110 is mounted to the shuttle 204. In operation, a roller 212, which is also mounted to the shuttle 204, presses the tape 110 against the conduits 102 and the base material 104, such that the tape 110, conduits 102 and base material 104 are all pressed together between the roller 212 and the plate 208. The conduits 102, being flexible, can be temporarily deformed or flattened during this process though the conduits 102 may substantially return to their original shape once the roller 212 passes over them.

A heating element 214 is mounted to the shuttle 204. The heating element 214 receives compressed air at a regulated air pressure. The compressed air is heated by the heating element 214 and delivered to an interface between the bonding tape 110 and the base material 104 by an air nozzle 216. As the shuttle 204 moves across the mat 100 (from left to right as shown in FIG. 4), heated air exits the nozzle 216 thereby heating the tape 110 and base material 104 just prior to their being pressed together by the roller 212. The amount of heat energy delivered to the interface is adjustable and is dependent upon the air temperature delivered to the heating element 214 and the speed at which the shuttle 204 moves across the mat 100. This heat energy is preferably adjusted so that the tape 110 is firmly bonded to the base material 104 due to thermoplasticity of the tape 110 and possibly also due to thermoplasticity of the base material 104.

The roller 212 is preferably formed of a heat-resistant elastic material. The roller 212 can be mounted on a lever arm 218 that is mounted to the shuttle 204. The pressure exerted by the roller 212 against the tape 110, conduits 102 and base material 104 is preferably adjustable and controlled by a rod 220 which can be mechanically or hydraulically actuated. Clamps 222 can be provided to secure the base material 104 from movement during the process of heating and adhering the tape 110 to the base material 104.

Once the shuttle 204 reaches the edge of the base material 104 as it moves from left to right, the air nozzle 216 preferably moves out of the way of the tape 110 and the rod 220 retracts so as to lift the roller 220 away from the mat assembly 100. Then, while the shuttle 204 continues to travel from left to right, a suction cup lifter 224 can be actuated to move downward and grab the tape 110 by suction and to lift the tape 110 clear of the mat assembly 100 while a cutter 225 (e.g., a motorized rotary fabric cutter) can be actuated to cut the tape 110. The cutter 225 preferably cuts the tape approximately even with the right-most edge of the material 100 or slightly longer to provide sufficient extra tape to be later trimmed flush with the edge of the material 100. The clamps 222 can then be released. Once the tape is cut, the shuttle 204 can be returned to its left-most position and the base material 104 and conduits 102 can be incrementally advanced (out of, or orthogonally to, the plane of FIG. 3) across the plate 208. The increment by which the material is advanced determines the distance between rows of tape and is preferably adjustable. For example, the desired increment may be input by the equipment operator. The clamps 222 can then be actuated once again to secure the base material 104. This positions the shuttle 204 and the materials to begin a next pass of the shuttle 204 and the process of adhering a next length of tape 110 to the base material 104.

The suction cup lifter 224 can include one, two or more suction cups. In an embodiment, suction is created by a vacuum air compressor which is configured to generate suction at the appropriate time in the cycle described above (i.e. prior to cutting the tape) and to release suction at an appropriate time in the cycle (i.e. after the tape is cut). In an embodiment, the suction cups of the suction cup lifter 224 can include air bleeds or vents to modulate the amount of vacuum generated.

The functioning of the apparatus 200 is preferably mechanized such that the various mechanical operations, including advancing the material and conduits, clamping the material, passing the shuttle over the material to adhere the tape and conduits, as well as the suction cup lifting and cutting of the tape, releasing the clamps and returning the shuttle into position for a next pass are all performed automatically without human intervention. In this way, the apparatus can manufacture the finished mat 100 with little human intervention. Human intervention is expected to be needed to initially load the apparatus 200 with material, configure adjustable parameters, activate the apparatus 200 and remove finished material.

As shown and described in connection with FIG. 4, the bonding tape 110 is bonded to the base material 104 as the shuttle 204 moves from left to right. It will be apparent that the apparatus can be configured such that the bonding tape 110 is bonded to the base material 104 as the shuttle 204 moves from right to left. For example, such an apparatus could appear as a mirror image to that shown in FIG. 4.

FIG. 4 additionally illustrates a display screen 224, which can be used to display information about operation of the apparatus 200 and to accept operator input (e.g., via touch screen input or other user interface). Such inputs can include, for example, adjusting the spacing between rows of tape, a heat setting for the heating element 214, downward pressure of the roller 212, air pressure at the nozzle 216, speed of the shuttle 204, and configuring print head 602 (FIG. 7), including selecting text to be printed.

Figure 5:
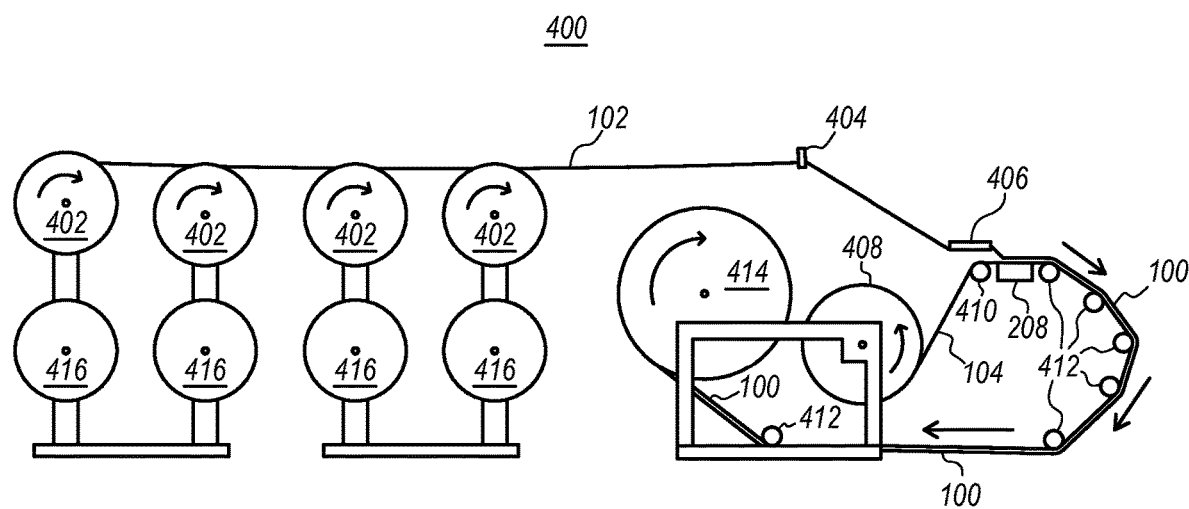
FIG. 5 illustrates a side view of an apparatus for feeding of material in connection with the manufacture of a mat with fluid conduit in accordance with an embodiment of the present invention.
Figure 6:
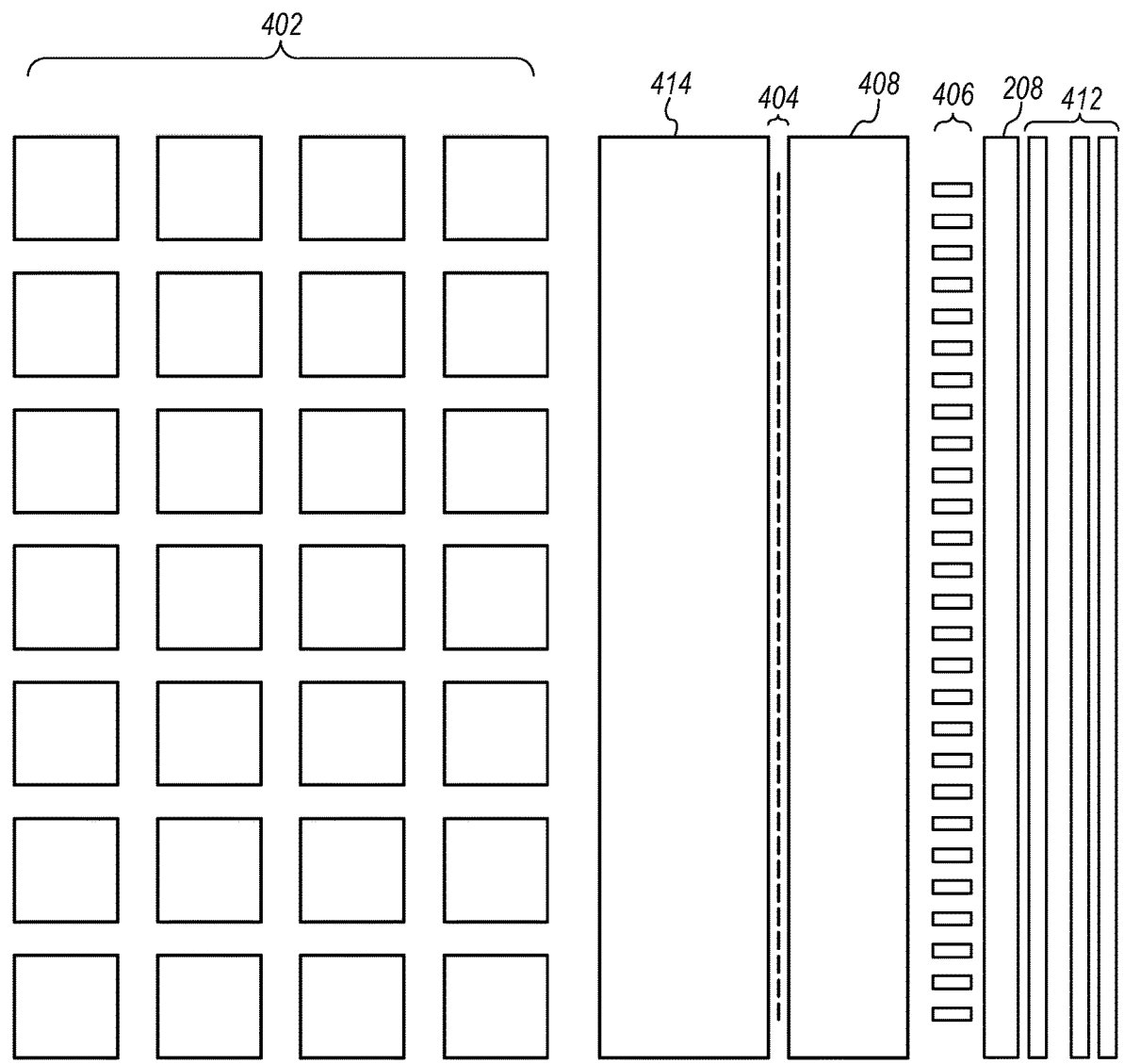
FIG. 6 illustrates a top view of an apparatus for feeding of material in connection with the manufacture of a mat with fluid conduit in accordance with an embodiment of the present invention.

FIG. 5 illustrates a side view of an apparatus 400 for feeding of material for the manufacture of the mat assembly 100 in accordance with an embodiment of the present invention. The apparatus 400 of FIG. 5 can be used on conjunction with the apparatus 200 of FIG. 4. FIG. 6 illustrates a top view of the apparatus 400 of FIG. 5 in accordance with an embodiment of the present invention. FIGS. 4, 5 and 6 illustrate front, side and top views, respectively, which views are 90 degrees apart from each other.

As shown in FIGS. 5 and 6, a plurality of spools 402, each holding conduit 102 (e.g., conduit for fluids or gas), are positioned to feed the conduit 102 towards the apparatus 200 shown in FIG. 4. FIG. 5 shows a side view of the plate 208 of FIG. 4 (upon which the heated tape 110, conduit 102 and base material 104 are pressed together) while FIG. 6 shows a top view of the plate 208; however, for clarity of illustration, some details, including the beam 202 and shuttle assembly 204, are omitted from FIGS. 5 and 6.

As also shown in FIGS. 5 and 6, each conduit 102 can pass through a corresponding eyelet 404 and guide tube 406 before reaching the plate 208. FIG. 5 also shows a roll 408 of base material 104 which, when unrolled, passes over a roller or guide 410 prior to reaching the plate 208. Arrows show the direction of material movement in FIG. 5. Once the materials pass over the plate 208 and are bonded together, the completed mat assembly 100 then passes over rollers or guides 412 and is spooled in a completed roll 414 of mat assembly 100. This roll 414 can then be removed from the apparatus 400. FIG. 5 also shows spools 416 which can be used for storage of conduit 102 prior to assembly into mat assemblies 100.

The eyelets 404 can each include a round opening through which the conduit passes. The eyelets 404 can include roller guides in order to reduce friction.

FIG. 6 shows the spools 402, roll 414, eyelets 404, roll 408, guide tubes 406, plate 208 and guides 412. For clarity of illustration, the conduits 102, base material 104 and other features are omitted from FIG. 6. FIG. 6 shows spacing of the guide tubes 406 which controls the spacing of the conduits 102 in the finished material 100. In an embodiment, the guide tubes 406 (and possibly also the eyelets 404) are mounted such that the spacing between them can be adjusted by an operator of the apparatus. Additionally, in some configurations, not all of the guide tubes 406 will be required and, thus, unused guide tubes 406 can preferably be moved out of the way.

Figure 7:
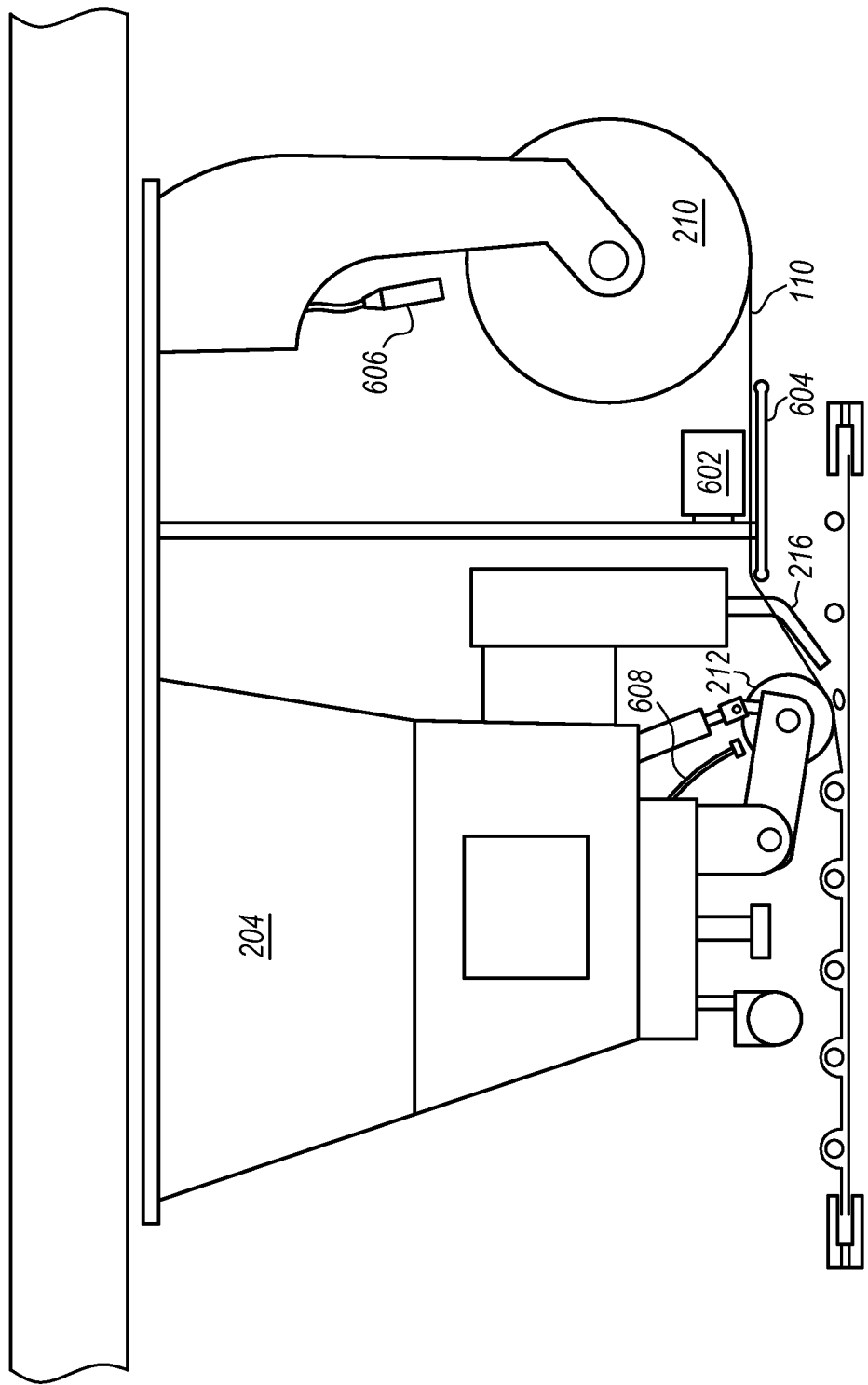
FIG. 7 illustrates a front view of an apparatus for the manufacture of a mat with fluid conduit, the apparatus including a print head, weld tape meter and cooling air jet in accordance with an embodiment of the present invention.

FIG. 7 illustrates an apparatus for the manufacture of a mat with fluid conduit including an print head, weld tape meter and cooling air jet in accordance with an embodiment of the present invention. FIG. 7 is similar to FIG. 4, except that FIG. 7 additionally illustrates a print head 602 and guide 604 that are coupled to the shuttle 204. This permits printing to be applied to the tape 110 prior to adhering the tape 110 to the base material 104. The tape 110 can be printed with a brand name or logo, identifying information (e.g., to identify a product type, application or product number), instructional information, barcode, or any other type of information.

FIG. 7 additionally illustrates a proximity sensor 606 that is configured to detect the size of the tape roll 210 by sensing the distance between the sensor 606 and the surface of the tape 210. As the tape roll 210 is consumed, this distance becomes larger which is detected by the sensor 606. In an embodiment, once the roll 210 reaches a predetermined reduced size, the sensor 606 triggers and audible and/or visual alarm which alerts the operator of the need to replace the tape roll 210. In an embodiment, the sensor 606 can be configured to halt operation of the apparatus as well.

FIG. 7 additionally illustrates an air cooling nozzle 608 which is configured to direct cooling air at the roller 212. This delivery of cooling air prevents the surface temperature of the roller 212 from becoming excessive (due to the heated air from nozzle 216) which could cause undesirable adherence of the tape 110 to the roller 212.

Figure 8:
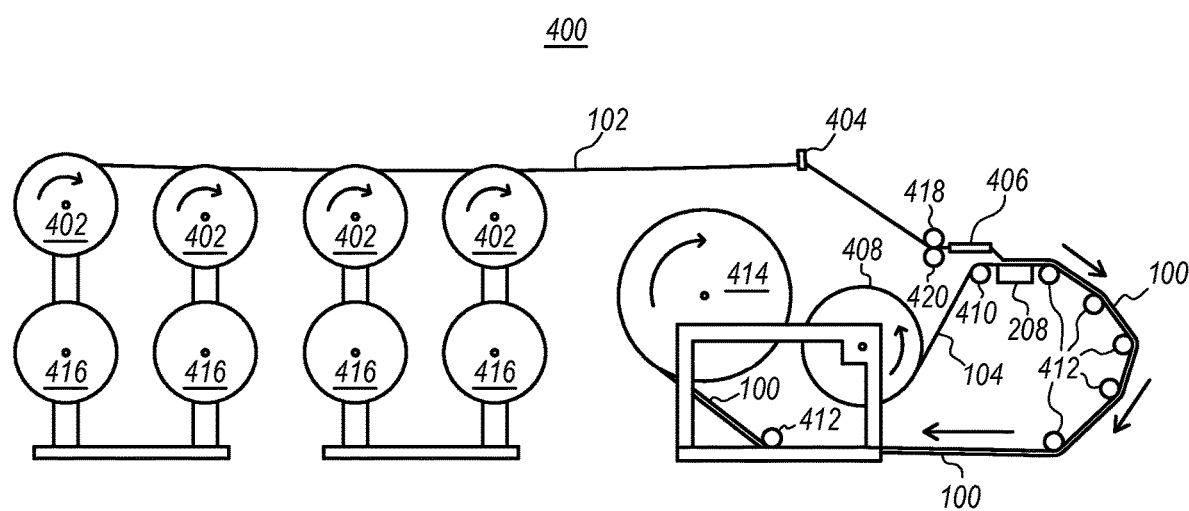
FIG. 8 illustrates a side view of an apparatus for feeding of material in connection with the manufacture of a mat with fluid conduit, the apparatus having conduit rollers in accordance with an embodiment of the present invention.

FIG. 8 illustrates a side view of an apparatus for feeding of material in connection with the manufacture of a mat with fluid conduit having conduit rollers in accordance with an embodiment of the present invention. FIG. 8 is similar to FIG. 5, except that FIG. 8 additionally illustrates a pair of guide rollers 418 and 420. The guide rollers 418 and 420 can extend the width of the apparatus (similar to rollers 412 shown in FIG. 6) and are positioned near the guide tubes 406. Conduit 102 passes between the guide rollers 418 and 420 before passing through the guide tubes 406. The rollers 418 and 420 function to align the conduit 102 with the guide tubes 406 so as to reduce friction between the conduit 102 and the guide tubes 406.

Figure 9:
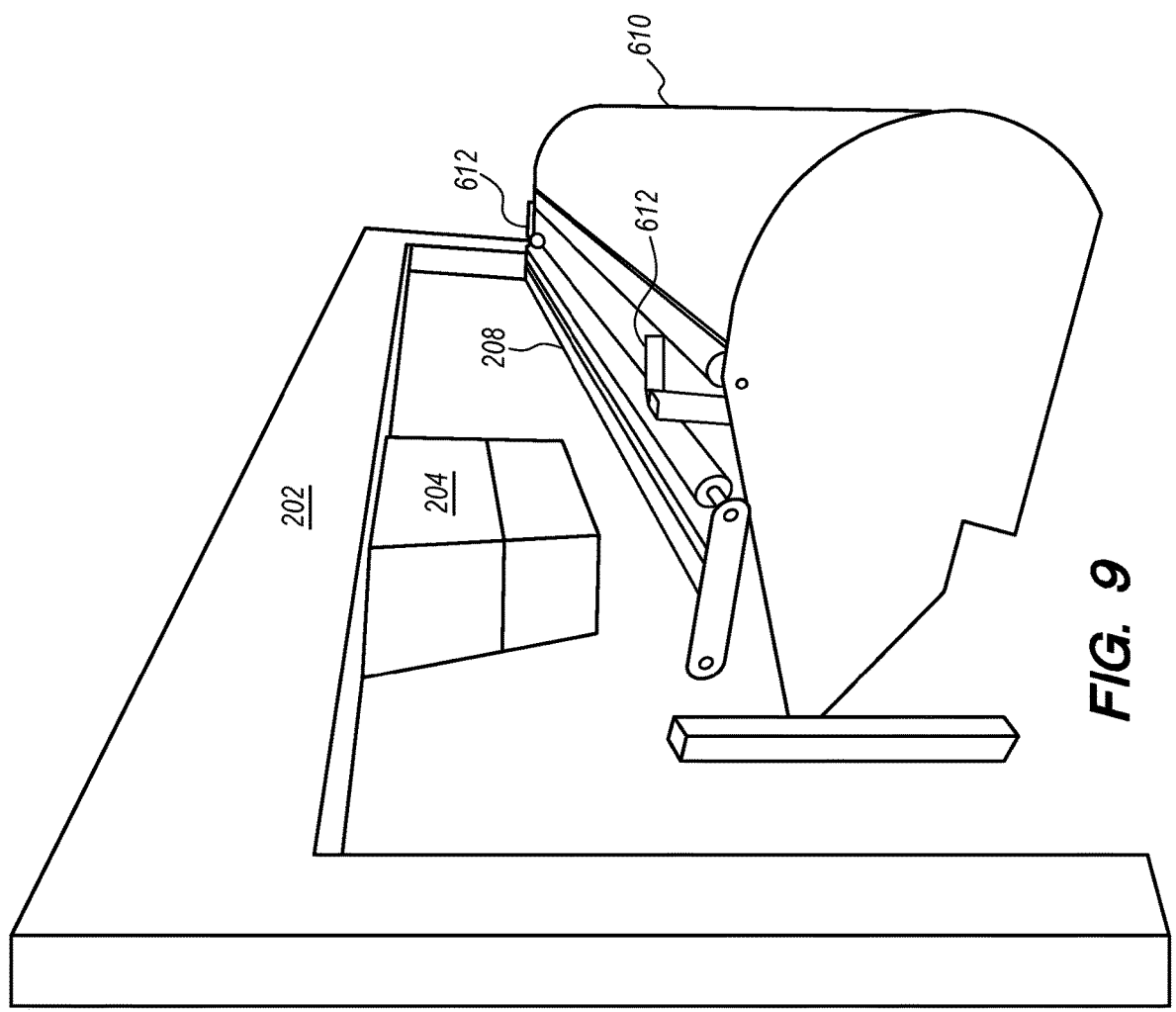
FIG. 9 illustrates a perspective view of an apparatus for the manufacture of a mat with fluid conduit in accordance with an embodiment of the present invention.

FIG. 9 illustrates a perspective view of an apparatus for the manufacture of a mat with fluid conduit in accordance with an embodiment of the present invention. For reference, FIG. 9 shows the beam 202, shuttle 204 and plate 208 described herein, however, some details of the apparatus shown in FIGS. 4-8 are omitted from FIG. 9 for clarity of illustration. FIG. 9 shows that the rollers 412 of FIGS. 5 and 8 can be replaced with a cylindrical load spreader 610. As shown in FIG. 9, finished material 100 to which the conduits have been attached passes over the load spreader 610 before being spooled into the completed roll 414 (FIGS. 5 and 8) of mat assembly 100. Cutters 612 may be provided to trim the ends of the tape 110 and/or the edges of the finished material 100. The cutters 612 are preferably movable from side to side to adjust to accommodate a desired width of the finished material 100.

Figure 10:
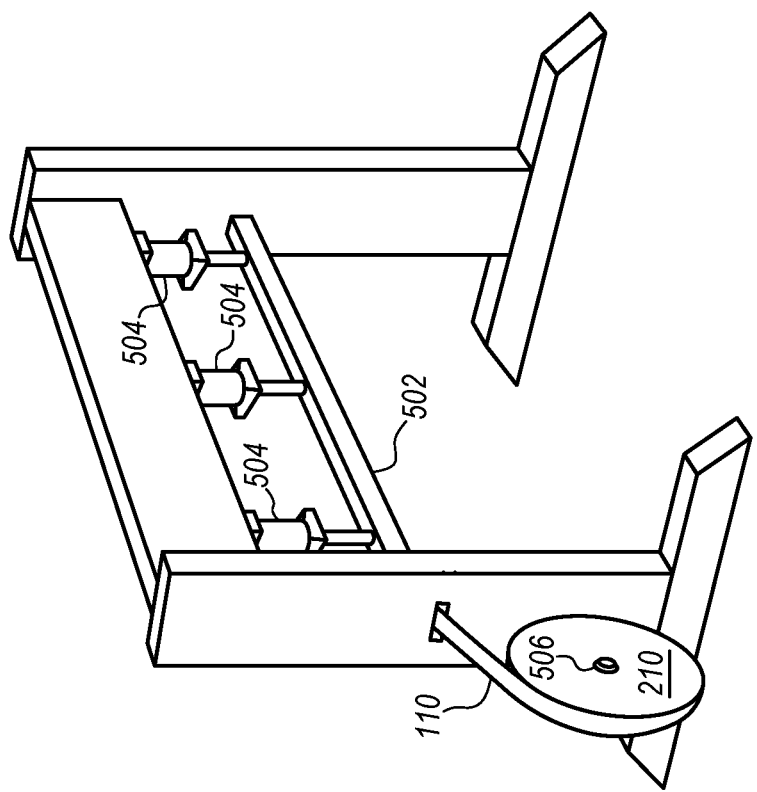
FIG. 10 illustrates a perspective view of an apparatus for the manufacture of a mat with fluid conduit in accordance with an alternative embodiment of the present invention.

FIG. 10 illustrates a perspective view of an apparatus for the manufacture of a mat with fluid conduit in accordance with an alternative embodiment of the present invention. The embodiment shown in FIG. 10 is similar to the embodiments shown and described herein in connection with FIGS. 4-9, except that the movable shuttle 204 is replaced by a heat sealing bar 502. The heat sealing bar 502 can include a heating element so that the entire bar 502 may be heated or so that a portion of the bar 502 may be heated. For example, an electrical heating wire can be contained within the bar 502. Such a heating wire may be in contact with the bar 502 so as to the heat the bar 502 itself or the electrical heating wire may be isolated from the bar 502 (e.g., by a heat insulator such as silicone rubber) so that the electrical heating wire can impart heat energy directly to the thermoplastic bonding tape 110.

The apparatus of FIG. 10 can used in conjunction with one or more of the apparatuses shown in FIGS. 5, 6, 8 and 9. Accordingly, the heat sealing bar 502 of FIG. 10 may be used to press the thermoplastic bonding tape 110 (e.g., FIG. 2) against the fluid conduits 102 (e.g., FIG. 2) and base layer 104 (e.g., FIG. 2) by trapping them between the sealing bar 502 and the plate 208 of FIGS. 5, 6, and 9. Also shown in FIG. 10 are pressure applicators 504 which may be, for example, electric motor driven or hydraulically actuated. The pressure applicators 504 function to move the bar 502 up and down and apply pressure to the bar 502 thereby pressing the bar 502 against the plate 208. In an embodiment, the plate 208 may be heated in order to aid in welding the tape to the base layer 104.

Also shown in FIG. 10 is the tape 110, tape roll 210 and a roll holder 506 for the tape roll 210. While not shown in FIG. 10 for clarity of illustration, it will be understood that elements of the apparatus shown in any of the figures herein may be incorporated into the apparatus of FIG. 10. This includes, but is not limited to, the plate 208, guide tubes 406, guide rollers 418 and 420, cylindrical load spreader 610, cutter 225, sensor 606 and cutters 612.

In the embodiment of FIG. 10, the tape 110 is unrolled from the roll 210 and positioned across the conduit 102 and base layer 104. The sealer bar 502 is then lowered onto the tape 110, conduit 102 and base layer 104. This may result in temporarily deforming the conduit 102. Heat is therefore applied to the tape 110 after the tape is positioned across the conduit 102 and base layer 104. Once the tape 110 is pressed onto and adhered to the base layer 104, the tape 110 may be cut and the finished material 100 may be advanced as described herein. Then, a next strip of tape 110 may be unrolled and positioned across the conduit 102 and base layer 104. The above-described steps may then be repeated.

Figure 11:
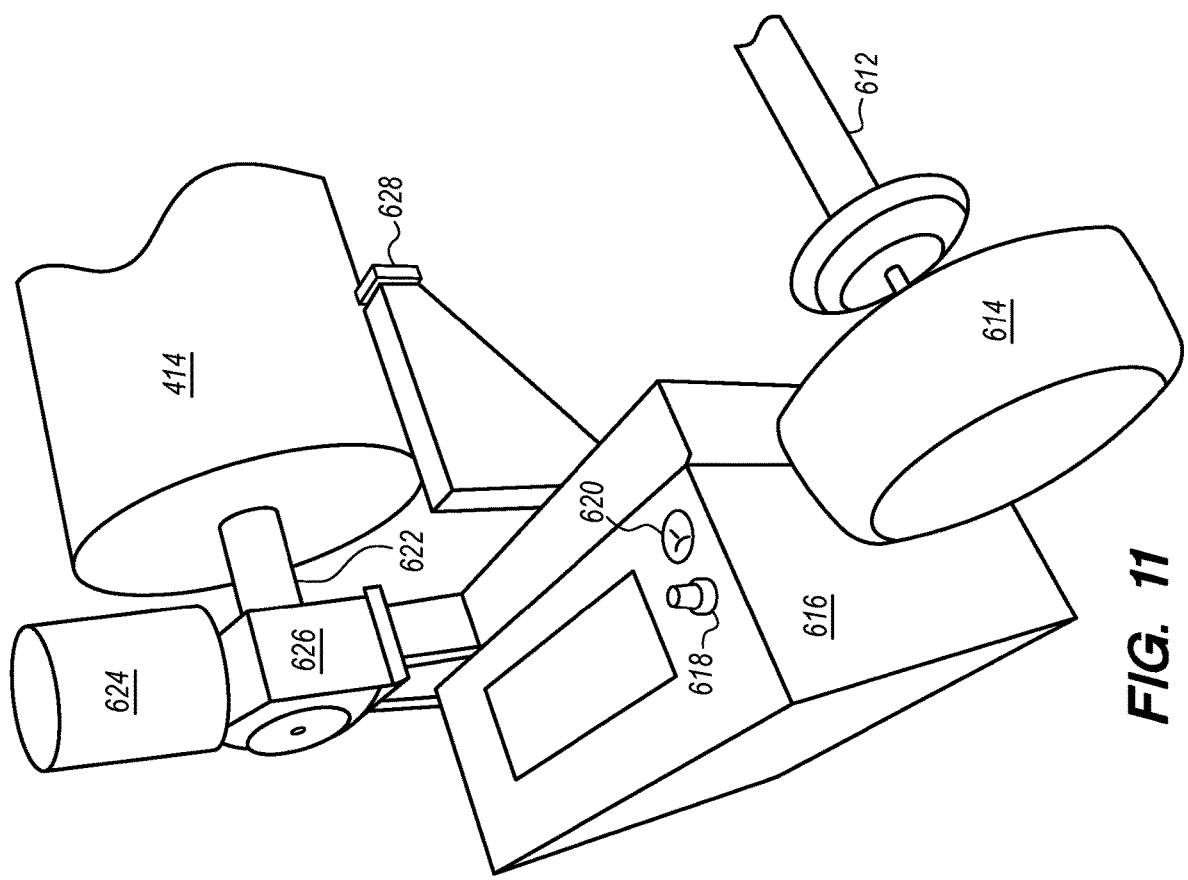
FIG. 11 illustrates a perspective view of a pneumatic brake assembly and finished material roll speed controller assembly in accordance with an embodiment of the present invention.

FIG. 11 illustrates a perspective view of a pneumatic brake assembly and finished material roll motion controller assembly in accordance with an embodiment of the present invention. FIG. 11 shows a shaft 612 upon which the roll 408 of base material 104 (FIGS. 5 and 8) is rolled. The shaft 612 is coupled to a pneumatic brake assembly 614 which applies braking force to the shaft 612 in order to maintain tension in the base material 104 as it is passed through the apparatus of FIGS. 4-9. Also shown in FIG. 11 is control housing 616 to which a control knob 618 and air pressure gauge 620 are mounted. The control knob 618 can be used to adjust the air pressure applied to the pneumatic brake assembly 614 and thereby control the braking force applied to the shaft 612. The pressure gauge 618 can be used to monitor the air pressure applied for pneumatic braking.

Also shown in FIG. 11 is the roll 414 of finished mat 100. The roll 414 can be mounted to a shaft 622 which is driven by a motor 624 and gear box 626. Turning of the shaft 622 draws material through the apparatus of FIGS. 4-9. The motor 624 is preferably controlled by control electronics such that the roll 414 is incrementally turned as the material is processed by the apparatus of FIGS. 4-9 and so as to maintain tension in the material against the pneumatic brake assembly 614. A proximity sensor 628 is configured to detect the size of the roll 414 by sensing the distance between the sensor 628 and the surface of the roll 414. The distance, as sensed by the proximity sensor 628, is used by the control electronics to control rotation of the shaft 622. This sensed distance information is useful because, as the roll 414 diameter increases, the shaft 622 needs to rotate by a lesser amount in order to draw the same length of material onto the roll 414. As explained herein, the finished material 100 is fed through the machine in increments that correspond to a desired distance between rows of tape. This increment can be controlled by turning the shaft 622 by an appropriate amount between the application of each row of bonding tape 110. However, in order to maintain uniform spacing between rows of tape, the shaft 622 will need to turn by different numbers of degrees (radians) dependent upon the outer diameter of the roll 414. To summarize, the sensor 628 determines the current size of the roll 414 which information is used to determine how much to rotate the shaft 622 to maintain uniform tape spacing. Electronics for controlling the motor 624 and configured to receive a signal from the sensor 628 can be contained in the housing 616. A user interface 630 at the housing 616 can include appropriate user controls (e.g. ON/OFF switches, emergency shut-off, etc.)

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A flexible mat with fluid conduit, comprising:
   a flexible base layer;
   a plurality of fluid conduits arranged substantially in parallel to each other and adjacent to the base layer; and
   a plurality of long and narrow strips of tape arranged substantially in parallel to each other and substantially orthogonal to the fluid conduits, the fluid conduits being positioned between the base layer and the strips of tape, and the strips of tape being thermoplastically welded to the base layer, thereby trapping the fluid conduits between the strips of tape and the base layer.

2. The flexible mat with fluid conduit according to claim 1, wherein one or more of the plurality of fluid conduits are configured to carry heat transfer fluid.

3. The flexible mat with fluid conduit according to claim 2, wherein the one or more of the plurality of fluid conduits configured to carry heat transfer fluid form part of a closed recirculating environmental control system.

4. The flexible mat with fluid conduit according to claim 1, wherein one or more of the plurality of fluid conduits are configured to carry irrigation water.

5. The flexible mat with fluid conduit according to claim 4, wherein the one or more of the plurality of fluid conduits configured to carry irrigation water comprise perforations or are configured to accept irrigation fittings.

6. The flexible mat with fluid conduit according to claim 1, wherein one or more of the plurality of fluid conduits are configured to carry gas.

7. The flexible mat with fluid conduit according to claim 1, wherein the plurality of fluid conduits are configured to carry two or more fluids selected from the group consisting of: heat transfer fluid, irrigation water, and gas.

8. The flexible mat with fluid conduit according to claim 1, wherein the base layer is thermoplastic.

9. The flexible mat with fluid conduit according to claim 1, the strips of tape being flexible.

10. The flexible mat with fluid conduit according to claim 1, the strips of tape comprising thermoplastic bonding tape.

* * * * *